US005198157A

United States Patent [19]

Bechet

[11] Patent Number: 5,198,157

[45] Date of Patent: Mar. 30, 1993

[54] ULTRASONIC DEVICE FOR THE CONTINUOUS PRODUCTION OF PARTICLES

[75] Inventor: Louis Bechet, Sciez, France

[73] Assignee: Dynamad S. A. R. L., Gaillard, France

[21] Appl. No.: 747,314

[22] Filed: Aug. 20, 1991

[30] Foreign Application Priority Data

Aug. 20, 1990 [FR] France ................................ 90 10608

[51] Int. Cl.[5] ................................ B29B 9/10

[52] U.S. Cl. ................................ 264/9; 75/335; 239/4; 239/102.2; 425/6

[58] Field of Search ................................ 264/9, 13; 425/6; 75/335; 239/4, 102.1, 102.2

[56] References Cited

U.S. PATENT DOCUMENTS

| | | | |
|---|---|---|---|
| 2,510,574 | 6/1950 | Greenhalgh | 264/9 |
| 3,790,079 | 2/1974 | Berglund et al. | 239/4 |
| 3,804,329 | 4/1974 | Martner | 239/4 |
| 4,245,227 | 1/1981 | Krause | 239/4 |
| 4,252,969 | 2/1981 | Broering et al. | 264/9 |
| 4,329,305 | 5/1982 | McClain | 264/9 |
| 4,801,411 | 1/1989 | Wellinghoff et al. | 264/9 |
| 4,871,489 | 10/1989 | Ketcham | 264/9 |
| 4,929,400 | 5/1990 | Rembaum | 264/10 |

FOREIGN PATENT DOCUMENTS

| | | | |
|---|---|---|---|
| 0202381 | 11/1986 | European Pat. Off. . | |
| 2537772 | 3/1977 | Fed. Rep. of Germany . | |
| 3036721 | 4/1982 | Fed. Rep. of Germany . | |
| 3150221 | 7/1983 | Fed. Rep. of Germany | 75/335 |
| 64-56811 | 3/1989 | Japan | 264/9 |
| 1-191707 | 8/1989 | Japan | 264/9 |

*Primary Examiner*—Mary Lynn Theisen

*Attorney, Agent, or Firm*—Sughrue, Mion, Zinn, Macpeak & Seas

[57] ABSTRACT

An ultrasonic device for the continuous production of microdroplets of uniform particle size distribution. This device comprises a vibrating surface (11) which, by its orthogonal ultrasonic vibratory mode, atomizes a material in the liquid state brought up from the interior of the device by means (20,22,24) comprising an intermediate flow-regulating and/or heat-regulating chamber (22) subjacent the vibrating surface (11).

13 Claims, 2 Drawing Sheets

ULTRASONIC DEVICE FOR THE CONTINUOUS PRODUCTION OF PARTICLES

This invention relates to an ultrasonic device for the continuous production of particles having as uniform a particle size distribution as possible, more particularly microdroplets of controlled diameter and sphericity.

The problem of producing finely divided microdroplets is encountered in numerous fields where organic and/or mineral liquids have to be sprayed or atomized, for example in the pharmaceutical field for delivering a suspended product (medicament or the like) by means of an aerosol or a product coated in a matrix (slow-release medicament). The same problem is encountered in the field of cosmetics, for example for producing what may now be called liposomes.

It is known that ultrasonic devices, such as those disclosed in DE 2 537 772 or DE 3 036 721 for the continuous production of microdroplets specifically from a liquid, can be used for this purpose, these devices—which comprise a vibrating surface—atomizing the liquid coming from inside under the effect of their orthogonal, ultrasonic vibratory mode. However, due to the configuration of the means for delivering the liquid, these known devices only operate providing the liquid does not have an excessive viscosity. In addition, the rate at which the liquid is delivered can be fairly irregular, the liquid being distributed in the form of a sheet of more or less constant thickness.

On the other hand, it is known that carburettors of internal combustion engines or injectors for boilers, such as described in EP 0 202 381, operate ultrasonically to atomize a liquid fuel. In view of the very narrow flow cross-sections involved, these atomizers can again only operate properly with volatile fuels.

Now, numerous components are at present being made from fine metal particles or granules, particularly by sintering processes. The problem of particle size distribution is significant because it is desirable to produce batches of microbeads all having substantially the same size.

An ultrasonic device enabling microbeads between 5 and 200 microns in diameter to be obtained is known in the field of molten metals. A material in the liquid state is allowed to fall dropwise onto the end surface of a vibrator oscillating at a frequency of 5 to 50 kilohertz. An ultrasonic vibrator comprises, for example, a piezoelectric transducer extended by a concentrator, i.e. an element of which the particular shape allows it to resonate on the end surface at a frequency higher by one order of magnitude than the oscillating frequency of the transducer. A vibrator of this type is also known as a "sonotrode" in the industrial field in question. This process is preferably carried out in an enclosure which enables the atmosphere to be controlled (either a vacuum or an inert gas).

When a drop of liquid falls onto the ultrasonic vibrating surface, it forms a film of which the upper surface assumes the form of a network of stationary waves having a wavelength of the order of 200 microns for example. When the amplitude of these waves reaches a sufficient value, drops of liquid separate from the crest of the waves and, by cooling, form solid microbeads of the order of 50 microns in diameter. It has been found that the diameter of the microbeads thus obtained depends to a large extent on the frequency of vibration of the surface. The distribution of the diameters about a mean value depends in part on the amplitude of vibration, but to a greater extent on the rheological characteristics of the material which varies significantly between a liquid and a molten material. For its part, the hourly output of microparticles depends on the amplitude of vibration and the dynamic viscosity coefficient of the material.

However, the ultrasonic device described above has parasitic effects due to the configuration and arrangement of the elements which give rise to a particle size distribution that is still unsatisfactory because the microbeads then have to be graded by passage through a series of screens. It has been found on the one hand that the wave network of the sheet of liquid is unstable on the vibrating surface and, on the other hand, that the thickness of the sheet was variable, namely thick near the place where the material arrives and very fine towards the edges of the surface.

The problem addressed by the present invention was to obviate the above-mentioned disadvantages due in large part to the flow rate and to the excessively irregular distribution of the liquid on the vibrating surface in order to produce microdroplets having a more controlled diameter in an improved output.

This problem has been solved by an ultrasonic device comprising a vibrating surface which, by its orthogonal ultrasonic vibratory mode, atomizes a material in the liquid state brought up from the interior of the device by means comprising an intermediate flow-regulating and/or heat-regulating chamber subjacent the vibrating surface. The base of the intermediate chamber, where the passage(s) for delivering the material in the liquid state open, is advantageously situated in the plane of a wave node of the vibratory regime.

In a useful embodiment, the material in the liquid state is distributed over the vibrating surface by one or more channels of which one of the dimensions of the flow cross-section is submillimetric and of which the total flow cross-section is greater than 8 $mm^2$, the flow of the material taking place by capillarity and/or by pressure gradient induced by the vibratory mode.

In the context of the invention, a "material in the liquid state" is understood to be both a liquid per se at ambient temperatures and a molten material, i.e. a material which is solid at ambient temperatures and which is made liquid as required This material may be mineral and/or organic. By virtue of the presence of the intermediate chamber, it becomes possible on the one hand to control the viscosity of the liquid on the vibrating surface through its temperature and, on the other hand, to control the losses of pressure more effectively by making the ejection channels, which are now shorter, with greater precision. Thus, an initially solid material may be kept in the liquid state or may be liquefied by heating in the intermediate chamber acting as a crucible very close to the vibrating surface.

In a first preferred embodiment, the internal intermediate chamber is cylindrical and parallel to the vibrating surface. The material in the liquid state is thus distributed by several channels situated at regular intervals along the line of the chamber closest to the surface.

In a second preferred embodiment, the internal intermediate chamber is central and has a tubular shape orthogonal to the vibrating surface into which it opens directly at one of its ends which may optionally be tapered.

In a third preferred embodiment, the tubular internal intermediate chamber is situated at the periphery of the vibrating device subjacent and orthogonal to the concave vibrating surface at the periphery of which it opens.

The vibrating surface advantageously comprises a network of parallel or crisscross grooves or a network of circular and/or radial grooves which tend to stabilize the position of the undulating regime of the film. The grooves may have a rectangular cross-section, a trapezoidal cross-section, a U-shaped cross-section, etc.

To improve the distribution of the material in the liquid state over the vibrating surface, the channels may be designed to open at an angle of 25° to 60° in relation to the surface. Alternatively, a cover parallel to the surface is arranged above and close to the exit of the channel(s).

Examples of embodiment of the invention are described in detail hereinafter with reference to the accompanying drawings, wherein.

Figure 1:
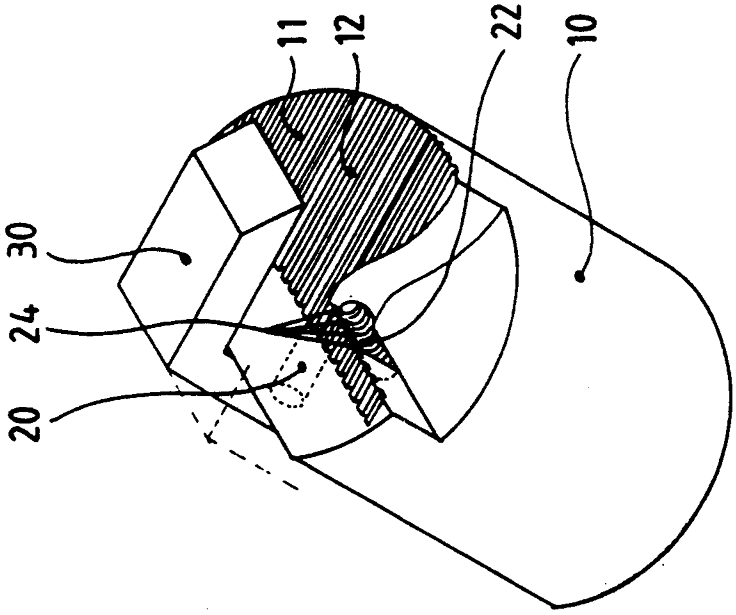
FIG. 1 is a partly exploded perspective view of a first embodiment of the ultrasonic device.

FIG. 1 shows the end of a vibrating element 10, in the present case the concentrator of a sonotrode, which terminates in a vibrating surface 11 forming an atomizer. The partial section through the vibrating element 10 shows an internal intermediate chamber 22 which is substantially cylindrical in shape and parallel in length to the atomizing surface 11 and which is used as an internal crucible. The internal intermediate chamber 22 is fed with a material in the liquid state, for example a melt, by a feed channel 20. Since the vibrating element 10 is heated, the molten material remains heated inside the intermediate chamber 22. The intermediate chamber 22 is connected to the atomizing surface 11 by a series of ejection channels 24, for example 15 in number. The ejection channels 24 are preferably arranged at regular intervals along that line of the intermediate chamber which is nearest surface. The diameter of each of the channels is of the order of 1 millimetre.

The vibratory mode of the sonotrode creates a difference in pressure between the channels 24 and the outside, causing the molten material to issue from the channels. In view of the narrow flow cross-section of each of the channels, the exit rate of the molten material is influence by capillary effects which are themselves dependent on the one hand on the ultimate shape and quality of machining of the channels and, on the other hand, on the rheological properties of the molten material which in turn are dependent on the final temperature of the material.

As can clearly be seen from FIG. 1, the atomizing surface 11 comprises a series of parallel and regular striae or grooves approximately 1 millimetre wide and approximately 0.25 millimetre deep for a spacing of the order of 2 millimetres. The ejection channels 24 respectively open at the bottom of a groove thus formed. The function of these grooves is to stabilize the spread film of material in its lateral position.

To prevent the projection of material beyond the vibrating surface 11 from the exit of the channels, a shoe is provided on the virbating element 10, its end forming a cover 30 which is parallel to the atomizing surface 11 and which is disposed above the ejection channels 24. The shape, dimensions and weight of the shoe and cover 30 are obviously gauged to avoid excessive modification of the vibratory regime of the vibrating element 10, particularly the concentrator.

Alternatively, the effect of the cover 30 may be replaced by oblique openings of the ejection channels 24, i.e. opening onto the vibrating surface 11 at an angle of 15° to 75° in relation to that surface. In practice, however, the formation of angled channels such as these is more difficult and, in addition, can create losses of pressure within the channels.

As will be appreciated, the feed rate of molten material onto the atomizing surface 11 is determined, on the one hand, by the flow cross-section of each of the channels 24 and, on the other hand, by the number of channels.

Figure 2:
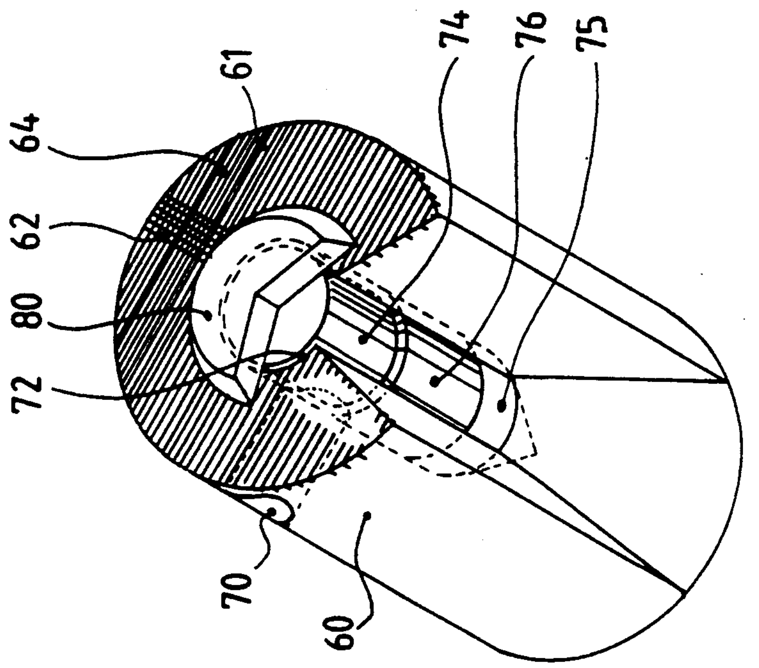
FIG. 2 is a partly exploded perspective view of a second embodiment of the ultrasonic device.

FIG. 2 shows a second variant of the end of the sonotrode in which the principal components are coaxial to the cylindrical vibrating element 60. To this end, a blind hole 75 is first drilled at the middle of the vibrating element 60. An element 76 is forcibly inserted into the blind hole thus drilled, its lower part having a diameter corresponding to that of the blind hole 75 and its upper part having a restriction 74.

The bottom of the element 76 is advantageously situated in the plane of a wave node, i.e. at a height of the sonotrode where the amplitude of vibration is minimal, thus voluntarily limiting the more or less controlled resonance of the element 76.

In conjunction with the upper part of the blind hole 75, the restriction 74 creates a cylindrical, elongate channel 72, i.e. an annular channel, which opens directly onto the upper atomizing surface 61. The annular channel acts both as an internal chamber/crucible and as an ejection channel. If the volume of this internal chamber has to be larger for reasons of flow regulation by buffer effect, the restriction 74 is reduced at its upper end to form a tapered ejection channel.

A trasverse feed channel 70 intersects the channel 72. The feed channel 70 can open into the blind hole 75 at any height, but preferably at its base or at the level of the wave node plane.

As can be seen from FIG. 2, the upper atomizing surface 61 also has a series of parallel grooves 64 substantially identical in their dimensions with the grooves shown in FIG. 1. It may be necessary to stabilize the film of molten material in the two axes of the plane of the surface 61, which is done by cutting complementary transverse grooves 62.

In addition, the element 76 is completed at its upper end by a cover 80 projecting beyond the exit of the channel 72. In the same way as before, the function of the cover 80 is to direct the molten material ejected towards the atomizing surface 61. Alternatively, the blind hole 75 could have a conical opening at the level of the surface 61 with an apex angle of 30° to 150° C. Thus, instead of a cover 80, the element 76 is conically widened at a corresponding angle.

Figure 3:
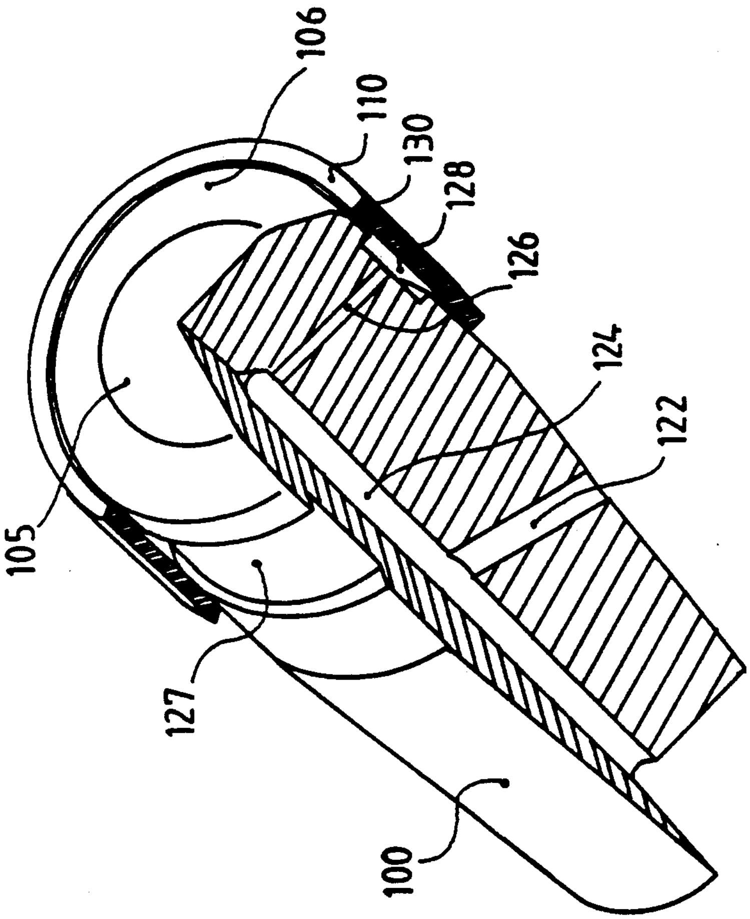
FIG. 3 is a partly exploded perspective view of a third embodiment of the ultrasonic device.

FIG. 3 shows a third variant of the end of the sonotrode comprising a cylindrical vibrating element 100, which becomes frustoconical in shape towards its lower end, and being formed in its upper part subjacent to the vibrating surface 105 with a peripheral groove 127 which forms an intermedate chamber 128 in conjunction with a detachable collar 110. The internal diameter of the collar 110 is larger than the external diameter of the vibrating element by 1 to 2 millimetres. The collar 110 is preferably fixed to the vibrating element 100 at the level of a wave node plane to limit possible vibrations in the manner of a bell.

The material may be brought to the intermediate chamber 128, preferably near the wave node, i.e. to the base of the chamber, through internal channels 122, 124 and 126 and even through an external channel. For machining reasons, the central channel 124 may be drilled from the lower surface so that the inlet opening is reclosed.

An ejection channel 130 is formed at the periphery of the vibrating surface 105 by the small difference between the external diameter of the vibrating element 100 and the internal diameter of the collar 110. As can be seen from FIG. 3, the vibrating surface 105 is slightly convex and, in particular, is rounded at the exit of the ejection channel 130. This rounded section avoids disruption of the film of liquid material progressing radially from the channel towards the centre of the surface. If necessary, the upper edge of the collar 100 may also be slightly turned radially inwards to accompany the movement of the liquid over the peripery of the vibrating surface.

The outer part 106 of the vibrating surface 105 also has a certain inclination of the order of 10° to 20° relative to the horizontal both to soften the rounded section at the exit of the ejection channel and to direct the majority of the microdroplets formed there towards the exterior of the device. Since this peripheral zone 106 is the most important from the point of view of the formation of microdroplets, it may be of advantage to cut a network of radial and circular grooves into this zone to regulate the distribution of the liquid material.

As will readily be appreciated, the sonotrode with its vibrating surface according to the invention is installed in an enclosed space to enable the surrounding medium to be controlled, i.e. to enable a vacuum or an inert gas atmosphere to be established.

The vibrating element 10 in FIG. 1 is advantageously inclined upwards at an angle of 45° with the feed channel 20 also directed upwards. A stream or sheet of liquid or a rod of preheated metal can thus be introduced into the channel 20 from above, the metal then melting in the internal intermediate chamber 20. Alternatively, the metal is preheated in a main crucible which is then brought into the molten state in the entry channel 20. It has been found that the grooves 12 provide for lateral stabilization of the sheet and, to a certain extent, for an intake of material coming from the channels.

The vibrating element 60 in FIG. 2 or the element 100 in FIG. 3 may be installed in the enclosure at an angle of 0° to 180° relative to the horizontal. However, even when the element is installed at an angle of greater than 90°, the sheet still remains on the vibrating surface 61 under the effect of surface tension. This phenomenon is further confirmed when the vibrating surface is directed downwards. The detached microdroplets are projected and fall directly downwards by gravity, cooling and forming microbeads during their descent.

If necessary, particularly for achieving higher vibration frequencies and hence smaller microbead diameters, it would also be possible to use a vibrating plate instead of the sonotrode, in which case the intermediate chamber with its ejection channels would be arranged in the plate beneath the upper surface.

The invention may be used in various fields where it is desirable continuously to produce particles having as uniform a size distribution as possible, including the fields mentioned earlier on, namely molten metals, pharmaceuticals, cosmetics and internal combustion engines.

Numerous improvements may be made to the ultrasonic device for the production of particles within the scope of the present invention.

I claim:

1. An ultrasonic device for the continuous production of microdroplets of uniform particle size distribution, said device comprising:

a piezoelectric transducer extended by a heat-regulated concentrator having an end surface which defines a vibrating surface for producing an orthogonal ultrasonic vibratory mode;

an internal intermediate flow-regulating chamber disposed within said concentrator subjacent with respect to said vibrating surface and for holding a material in a liquid state, said internal intermediate flow-regulating chamber serving as a crucible; and at least one channel for connecting said internal intermediate flow-regulating chamber to said vibrating surface thereby to permit distribution of said material in said liquid state over said vibrating surface, whereby said orthogonal ultrasonic vibratory mode of said vibrating surface atomizes said material in said liquid state which is distributed over said vibrating surface.

2. The ultrasonic device according to claim 1, wherein said at least one channel includes a flow cross-section in which one of the dimensions is submillimetric and of which a total flow cross-section is greater than 8 $mm^2$, the flow of said material taking place by capillarity thermally controlled and by pressure gradient induced by said vibratory mode.

3. The ultrasonic device according to claim 1, wherein said internal intermediate flow-regulating chamber is cylindrical, parallel to and below said vibrating surface, and further comprising a plurality of channels situated at regular intervals along the line of said chamber closest to said surface and for distributing said material in said liquid state.

4. The ultrasonic device according to claim 1, wherein said internal intermediate flow-regulating chamber is centrally disposed and has a tubular shape orthogonal to said vibrating surface into which said internal intermediate flow-regulating chamber opens directly at one end thereof which is tapered.

5. The ultrasonic device according to claim 4, wherein said vibrating surface is convex and wherein said tubular internal intermediate flow-regulating chamber is situated at the periphery of said concentrator subjacent and orthogonal to said convex vibrating surface at the periphery of which it opens.

6. The ultrasonic device according to claim 1, wherein said internal intermediate flow-regulating chamber includes a base and said concentrator includes at least one passage which opens into said base and is for delivering said material in said liquid state, said at least one passage being situated in the plane of a wave node of the vibratory regime.

7. The ultrasonic device according to claim 2, wherein said at least one channel opens onto said vibrating surface at an angle of 25° to 75° relative to said surface.

8. The ultrasonic device according to claim 3, wherein each of said plurality of channels opens onto said vibrating surface at an angle of 25° to 75° relative to said surface.

9. The ultrasonic device according to claim 4, wherein said at least one channel opens onto said vibrating surface at an angle of 25° to 75° relative to said surface.

10. The ultrasonic device according to claim 5, wherein said at least one channel opens onto said vibrating surface at an angle of 25° to 75° relative to said surface.

11. The ultrasonic device according to claim 1, wherein said vibrating surface comprises a network of parallel or crisscross grooves or a network of circular or radical grooves.

12. The ultrasonic device according to claim 11, wherein said grooves have a rectangular cross-section.

13. A process for the production of microbeads from thermofusible material with an ultrasonic device, said ultrasonic device comprising a vibrating surface; and an internal intermediate flow and heat regulating chamber disposed subjacent to and connected with said vibrating surface and for holding said thermofusible material in a liquid state, said process comprising the steps of:

a) vibrating said vibrating surface thereby producing an orthogonal ultrasonic vibratory mode;
b) bringing said thermofusible material in the liquid state from said intermediate flow and heat regulating chamber to said vibrating surface; and
c) atomizing said thermofusible material in the liquid state with said vibrating surface.

* * * * *